US007225331B1

(12) United States Patent
McBrearty et al.

(10) Patent No.: US 7,225,331 B1
(45) Date of Patent: May 29, 2007

(54) SYSTEM AND METHOD FOR SECURING DATA ON PRIVATE NETWORKS

(75) Inventors: Gerald Francis McBrearty, Austin, TX (US); Shawn Patrick Mullen, Buda, TX (US); Johnny Meng-Han Shieh, Austin, TX (US); Ramachandran Unnikrishnan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 09/594,517

(22) Filed: Jun. 15, 2000

(51) Int. Cl.
*H04L 9/00* (2006.01)
*H04K 1/00* (2006.01)
*G06F 17/30* (2006.01)
*G06F 15/16* (2006.01)

(52) U.S. Cl. ...................... 713/158; 713/171; 380/278; 380/259; 380/260; 380/283; 726/2; 726/14

(58) Field of Classification Search ................ 713/201, 713/150, 171, 165, 158; 380/22, 277, 283, 380/278, 259–260; 726/2, 13
See application file for complete search history.

(56) References Cited

U.S. PATENT DOCUMENTS

| 4,200,770 | A |   | 4/1980  | Hellman et al. |         |
|-----------|---|---|---------|----------------|---------|
| 4,227,253 | A | * | 10/1980 | Ehrsam et al.  | 380/45  |
| 4,249,180 | A | * | 2/1981  | Eberle et al.  | 380/37  |
| 5,241,594 | A | * | 8/1993  | Kung           | 713/151 |
| 5,721,779 | A | * | 2/1998  | Funk           | 713/155 |
| 5,724,424 | A |   | 3/1998  | Gifford        | 380/24  |
| 5,812,764 | A | * | 9/1998  | Heinz, Sr.     | 713/202 |
| 6,044,155 | A | * | 3/2000  | Thomlinson et al. | 713/155 |
| 6,061,796 | A | * | 5/2000  | Chen et al.    | 713/169 |
| 6,088,451 | A | * | 7/2000  | He et al.      | 713/201 |
| 6,317,829 | B1 | * | 11/2001 | Van Oorschot   | 713/155 |
| 6,351,813 | B1 | * | 2/2002  | Mooney et al.  | 713/185 |
| 6,490,680 | B1 | * | 12/2002 | Scheidt et al. | 713/166 |
| 6,539,479 | B1 | * | 3/2003  | Wu             | 713/151 |
| 6,591,251 | B1 | * | 7/2003  | Leon et al.    | 705/60  |
| 6,601,175 | B1 | * | 7/2003  | Arnold et al.  | 713/202 |
| 6,640,302 | B1 | * | 10/2003 | Subramaniam et al. | 713/169 |
| 6,668,321 | B2 | * | 12/2003 | Nendell et al. | 713/169 |

(Continued)

FOREIGN PATENT DOCUMENTS

JP 363039228 A * 2/1988

*Primary Examiner*—Hosuk Song
*Assistant Examiner*—Linh L D Son
(74) *Attorney, Agent, or Firm*—VanLeeuwen & VanLeeuwen; Herman Rodriguez

(57) ABSTRACT

A system and method for protecting data transmitted across a private network is disclosed. A secure channel is established so that the client computer can securely transmit a password to the server computer. Once the password has been transmitted, future transmissions use the password to encrypt data by the sending computer and decipher the data at the receiving computer. In one embodiment, passwords expire after a certain amount of time and are thereafter renegotiated. In another embodiment, the password is successively modified by a counter value further preventing unauthorized persons from discovering the password used to encrypt the data. By using passwords rather than public-key encryption methods, less system resources are required to maintain data confidentiality. An information handling system securely transmitting data within a private network as well as a computer program product programmed to perform the encryption processing are further disclosed.

21 Claims, 7 Drawing Sheets

U.S. PATENT DOCUMENTS

| | | | |
|---|---|---|---|
| 6,681,017 B1 * | 1/2004 | Matias et al. | 380/277 |
| 6,681,327 B1 * | 1/2004 | Jardin | 713/153 |
| 6,711,679 B1 * | 3/2004 | Guski et al. | 713/156 |
| 6,735,310 B1 * | 5/2004 | Hsing et al. | 380/28 |
| 6,851,053 B1 * | 2/2005 | Liles et al. | 713/168 |

* cited by examiner

SYSTEM AND METHOD FOR SECURING DATA ON PRIVATE NETWORKS

BACKGROUND OF THE INVENTION

1. Technical Field

The present invention relates in general to a method and system for securing private networks. Still more particularly, the present invention relates to an improved method and system encrypting information between server and client computers in a private network.

2. Description of the Related Art

A computer network becomes disproportionately more difficult to manage as it increases in size, complexity and geographic dispersion. Management of the network involves configuration of software available on the machines or for a user in the network, coordination of access to shared resources and implementation of security measures. In addition, communication traffic on the computer network is monitored to ensure that the system is configured appropriately to reduce security risks and to improve efficiency.

Computer network security typically is implemented from the point of view that computer networks external to an enterprise are inherently untrusted and that computer networks internal to an enterprise are inherently trusted. As a result, security tends to be implemented using perimeter, or point of access, security mechanisms where communications from the external network enter into the internal network. One common way to implement connectivity with computers external to the enterprise is by encrypting and authenticating such communications using a protocol such as Secure Socket Layers (SSL). Such a system, however, does not protect against internal security breaches.

One way communications internal to an enterprise could be protected would be by encrypting internal communications using public key encryption such as used in SSL. Public key encryption uses a pair of asymmetric keys for encryption. One of these pairs is referred to as a "public" key and is shared with others, while the other key is a "private" key which is never distributed and is always kept secret. When data is encrypted using the public key, it can only be deciphered using the private key, and vise-versa (i.e., data encrypted using the private key can only be deciphered using the public key). In order to establish the secure link between two computers, one computer initiates a "handshake" with another computer to exchange public keys and establish a secure connection.

Using public key encryption on a private network presents challenges to the enterprise. First, while performing handshakes between every computer on the private network would secure the network, the security processing would result in poor performance on the network as more resources would be devoted to implementing security. A second challenge faced when confronting the first challenge, is determining which connections need to be secure in order to prevent unintentional disclosure of sensitive information. For example, an employee sending medical information to the company's medical department may want the information to be kept secret from others not in the medical department. However, the same employee sending a bulletin intended for all employees probably does not care to encrypt the information.

What is needed, therefore, is a way to seamlessly secure certain communications across a private network without overloading system resources and without making the system too complex to efficiently manage.

SUMMARY

It has been discovered that data can be secured between a client computer and a server computer by first establishing a secure link between the two computers using a public-key encryption methodology followed by the client computer transmitting a password that the client wishes to use to encrypt subsequent information flowing between the client and server computers. The server computer keeps track of clients and the clients' corresponding passwords for use with future communications with such clients.

In one embodiment, a server designed to receive confidential information is programmed to respond to client requests with a message informing the client that the server accepts encrypted data. Following the receipt of the server's response, the client initiates the public-key handshaking and sends the server a password that the client would like to use for future transmissions.

In another embodiment, the password is modified periodically to prevent a third party from eventually discovering the password used by the client. One way the password can be modified is by including a counter with the password. In this manner, someone would not only need to know the original password set by the client, but would also need to know the number of transmissions previously sent between the client and the server. Another way the password can be modified is by periodically (i.e., every 24 hours) requiring the client to renegotiate a new password by establishing the secure public-key channel between the client and the server and transmitting a new password to the server. A combination of these two password modification schemes can also be implemented for further securing communications between the client and server computers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
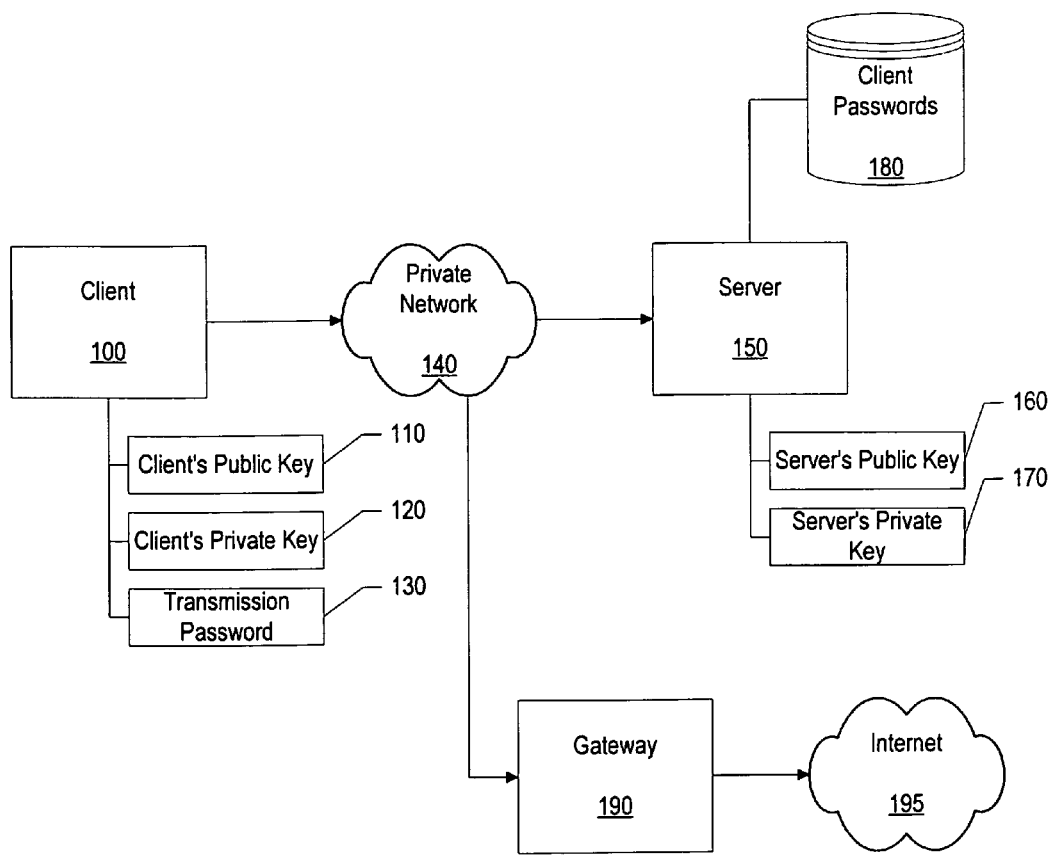
FIG. 1 is a high level system drawing showing components involved in the present invention.

FIG. 1 shows a high level system diagram showing components involved in securing communications between client computer 100 and server computer 150 across private network 140. As shown, client computer 100 includes client's public key (CPK) 110. Client's public key 110 is sent to other computers as a key for encrypting data. When client's public key is sent to another computer, the other computer encrypts data using the public key and sends the encrypted data back to client. Client computer then deciphers the encrypted data using client's private key (CpK) 120. The exchange of public keys is the basis of Diffie-Hellman type encryption used to establish Secure Socket Layers (SSL) security on the Internet and in other applications.

Client's public key 110 is sent through private network 140 to server computer 150. Server computer receives client's public key 110 and transmits server's public key (SPK) 160 back to client. Neither client computer 100 nor server computer 150 discloses their respective private keys (client's private key 120 and server's private key 170). The public keys are exchanged to establish a secure channel across private network 140.

As will be appreciated by those skilled in the art, private network 140 may be an local area network, such as an intranet. Gateway computer 190 can be used to connect private network 140 to Internet 195 in order to access computers located in distant locations. Also, as will be appreciated by those skilled in the art, while described as being used in a preferred embodiment of a private network, the present invention is useful in any network environment, including the Internet, to secure data transmitted between computers.

Once a secure connection is established by the exchange of client's public key 110 and server's public key 160, client computer selects and transmits password 130 used in future communications with server computer 150. Password 130 is received by server 150 and stored in database 180 along with the client's address. Thereafter, when client computer 100 sends a packet of data to server computer 150, the server computer retrieves the client's password from database 180 and uses the password to decipher client's data packet.

Figure 2:
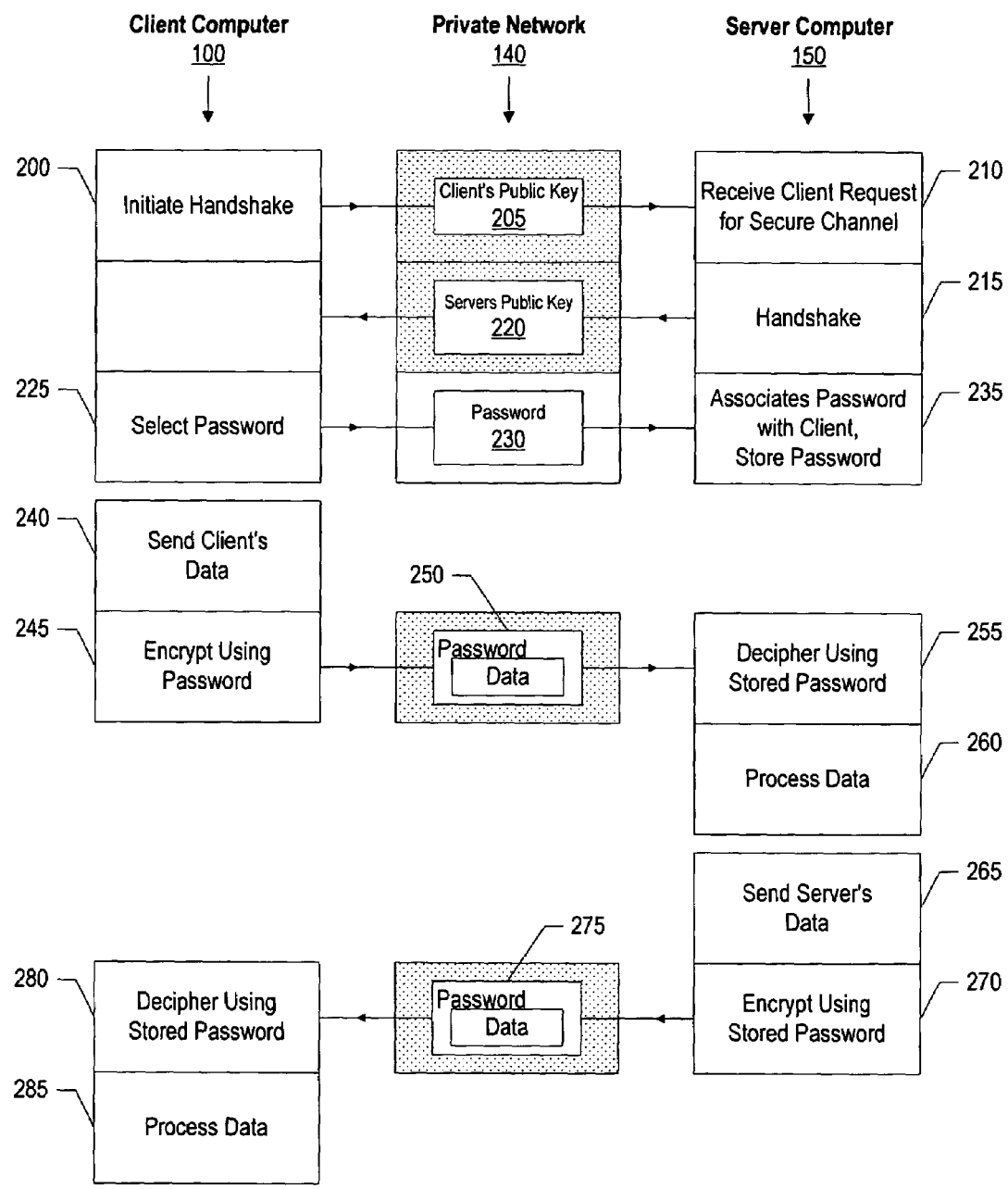
FIG. 2 is a data diagram showing data across the private network between the client and server computers.

FIG. 2 is a data diagram showing data flowing through private network 140 between client computer 100 and server computer 150. Client computer 100 contacts server computer 150 and initiates handshake 200 by transmitting client's public key 205 across private network 140 and received at step 210 by server computer 150. Server computer then completes the handshake (step 215) by transmitting server's public key 220 across private network to client computer 100. Note that during the handshake processing, the data is transmitted across an unsecured channel within private network. However, after the handshaking is complete, a secure channel exists between client computer 110 and server computer 150.

Client computer 100 then selects a password (step 225) and transmits password 230 across the secure channel created within private network 140 to server computer 150. Server computer 150 is programmed to accept any password sent by client computer 100. Alternatively, server computer can be programmed to require that password 230 conform to certain rules (i.e., certain length, contain at least some numeric data, etc.). Server computer 150 accepts client password and associates the password with the client computer's address (step 235). Server computer also stores the client computer address and the password for future referencing.

Client computer 100 prepares data that is to be processed by server computer 150 (step 240). The data is encrypted (step 245) using password 230. Encrypted data file 250 is transmitted across private network 140 to server computer 150. Note that a secure channel does not exist for the transmission of encrypted data file 250. However, eavesdroppers or other snoopers are unable to view the contents of encrypted data file 250 since it was encrypted using password 230. When encrypted data file 250 is received by server computer 150 (step 255), the data file is deciphered using the password that server computer 150 received and stored in step 235. Once encrypted data file 250 is deciphered, server computer 150 processes the data (step 260). Server 150 prepares data to be returned to client computer (step 265). In order to make sure the responsive data is protected, server computer 150 encrypts the responsive data using the stored password (step 270). Encrypted response data 275 is transmitted across private network 140 and received by client computer 100 where it is deciphered using the password (step 280). The deciphered response date can then be processed by client computer 100 (step 285).

By establishing a password between client computer 100 and server computer 150, data can be safely transmitted between the computers in an encrypted fashion without the overhead involved with establishing and maintaining secure connections between the machines. Problems with establishing and maintaining secure connections is exacerbated when multiple clients establish secure connections with multiple servers impacting system performance and throughput.

Figure 3:
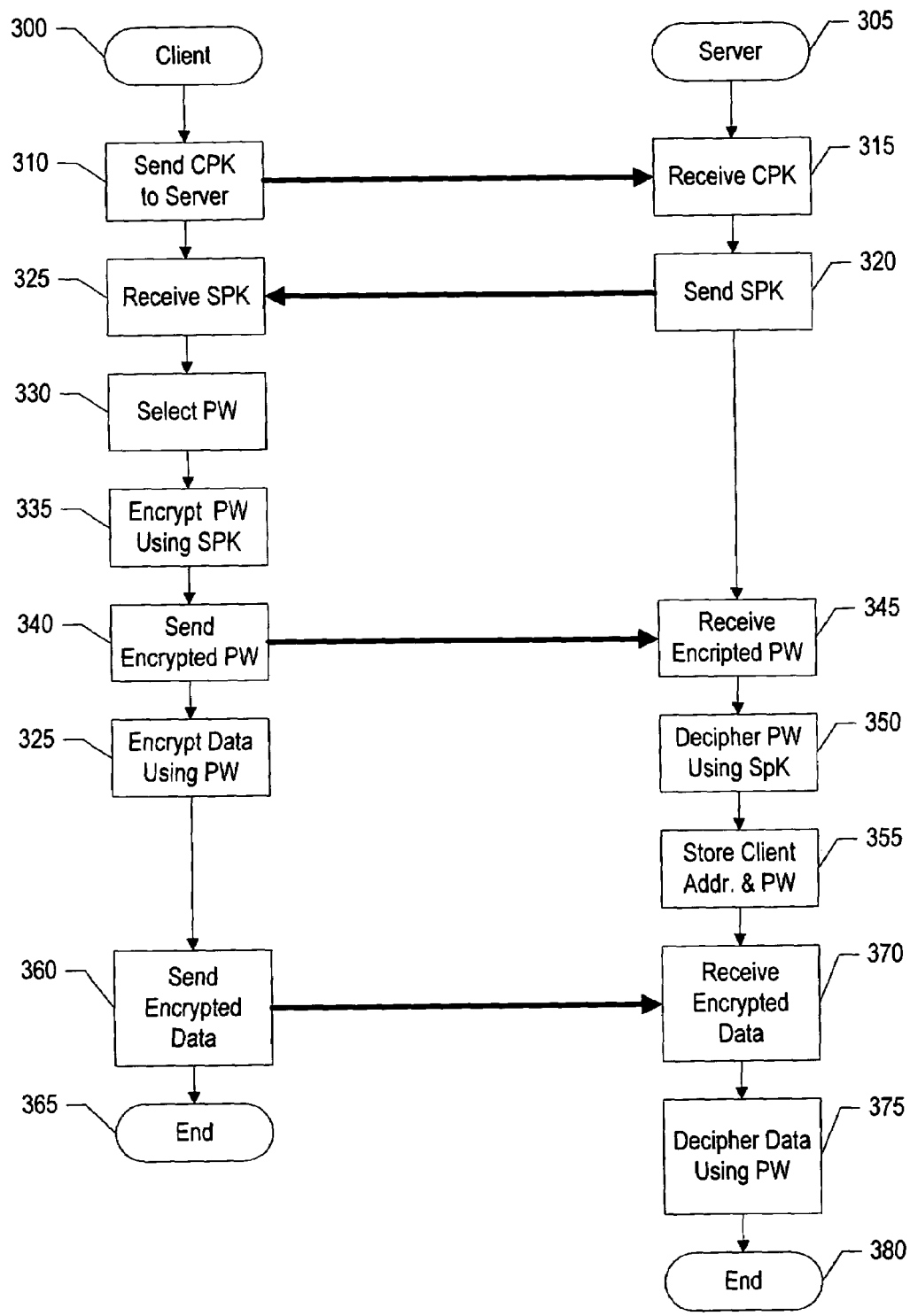
FIG. 3 is a flowchart showing client establishing a password with server.

FIG. 3 shows a flowchart to establish a password and send encrypted data across a private network. Client computer begins its processing at step 300 and sends client's public key to the server computer (step 310). Server computer begins its processing at step 305 and receives client's public key (step 315). Server computer responds by sending server's public key back to client (step 320) where it is received by client computer (step 325). At this point, the pubic keys have been exchanged and a secure connection can be established. Client computer select a password to use in further communications with the server (step 330). The password is encrypted using server's public key (step 335). The encrypted password is then sent to the server computer (step 340). The server computer receives the encrypted password (step 345). The server then deciphers the password using server's private key (step 350). As a public key-private key pair, only the private key can be used to decipher data that was encrypted using the public key. The server computer now stores the client computer address and the password that was chosen by the client (step 355).

Back at the client computer, data is encrypted using the password that was sent to the server (step 325). After the data is encrypted, the encrypted data is sent to the server computer (step 360). Client computer is now able to continue sending and receiving encrypted data with server computer using the password that is now known by both computers. Server computer receives the encrypted data sent by the client computer (step 370) and deciphers the data using the stored password (step 375). This portion of the encryption processing is concluded, terminating at client (step 365) and server (step 380).

Figure 4:
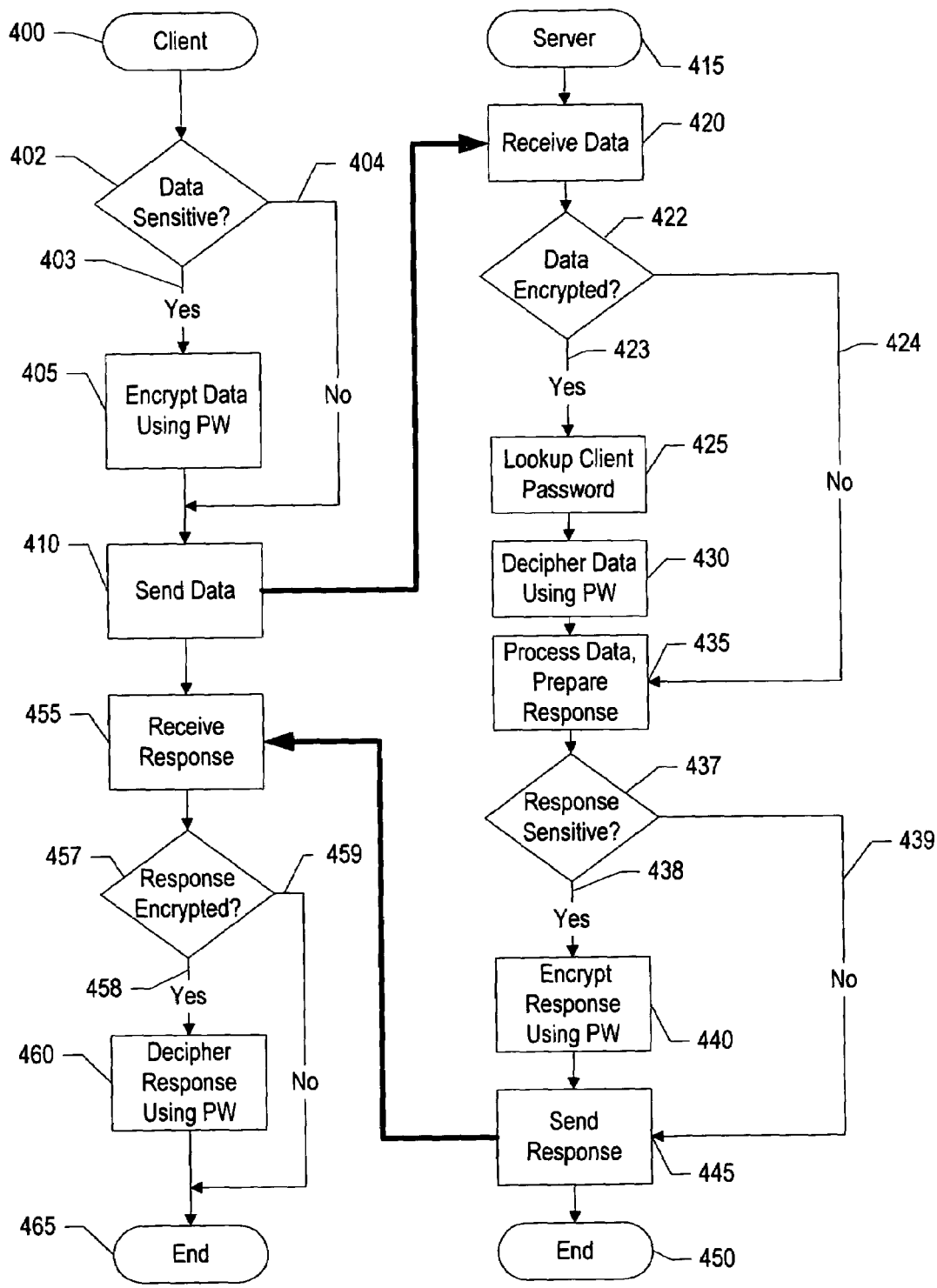
FIG. 4 is a flowchart showing server processing an encrypted submission from client.

FIG. 4 shows how subsequent data can be sent from the client computer to the server computer without the need for establishing a secure channel. Client computer begins processing at step 400 thereafter determining whether the data to be sent to the server is sensitive or confidential (decision 402). If the data is sensitive or confidential, "yes" branch 403 is taken whereupon the data is encrypted (step 405) using the password established in FIG. 3 before it is sent to the server (step 410). On the other hand, if the data is not sensitive or confidential, decision 402 branches to "no" branch 404 bypassing the encryption step and sending the plain data to the server in step 410. One way the determination can be made as to whether the data is sensitive is by storing sensitive data in a particular location (i.e., subdirectory or database table) on the nonvolatile storage device attached to the client computer. Another way the determination can be made is by displaying a dialog box to the user prior to the transmission and having the user select whether the transmission contains sensitive or confidential information.

Server computer begins its processing at step 415 thereafter receiving the data file from the client computer (step 420). The server determines whether the data file is encrypted (decision 422). If the data is encrypted, "yes" branch 423 is taken whereupon steps 425 and 430 are performed as described below. If the data file is not encrypted, "no" branch 424 is taken bypassing the deciphering steps. One way the server can determine whether the received file is encrypted is by reserving a particular file type or other designation for the file being transmitted from the client computer. Another way the server can make the determination is by analyzing the internal contents or structure of the transmitted file and, based either upon a particular header or file organization, determining that the file is encrypted.

Along with the data file, the server computer received the network address of the client computer. The network address of the client computer was associated with the password supplied by the client computer. The server uses the network address of the client computer to look up the client's password (step 425). Once the password is located, the encrypted data is deciphered using the password. The data is processed and the server computer prepares a response based on the data (step 435).

The server determines whether the response contains sensitive or confidential information (decision 437). If the response is not sensitive or confidential, "no" branch 439 is taken bypassing the encryption step. On the other hand, if the response contains sensitive or confidential information, "yes" branch 438 is taken and the server computer encrypts the responsive data using the password (step 440). The response (encrypted or non-encrypted) is then sent back to the client computer (step 445) and this section of server processing is concluded at 450.

The client computer receives the response data (step 455) and determines whether the response is encrypted (decision 457). If the response is encrypted, "yes" branch 458 is taken and the response is deciphered using the password (step 460). If the response is not encrypted, the deciphering step is bypassed by "no" branch 459. Client processing is then terminates at step 465.

Figure 5:
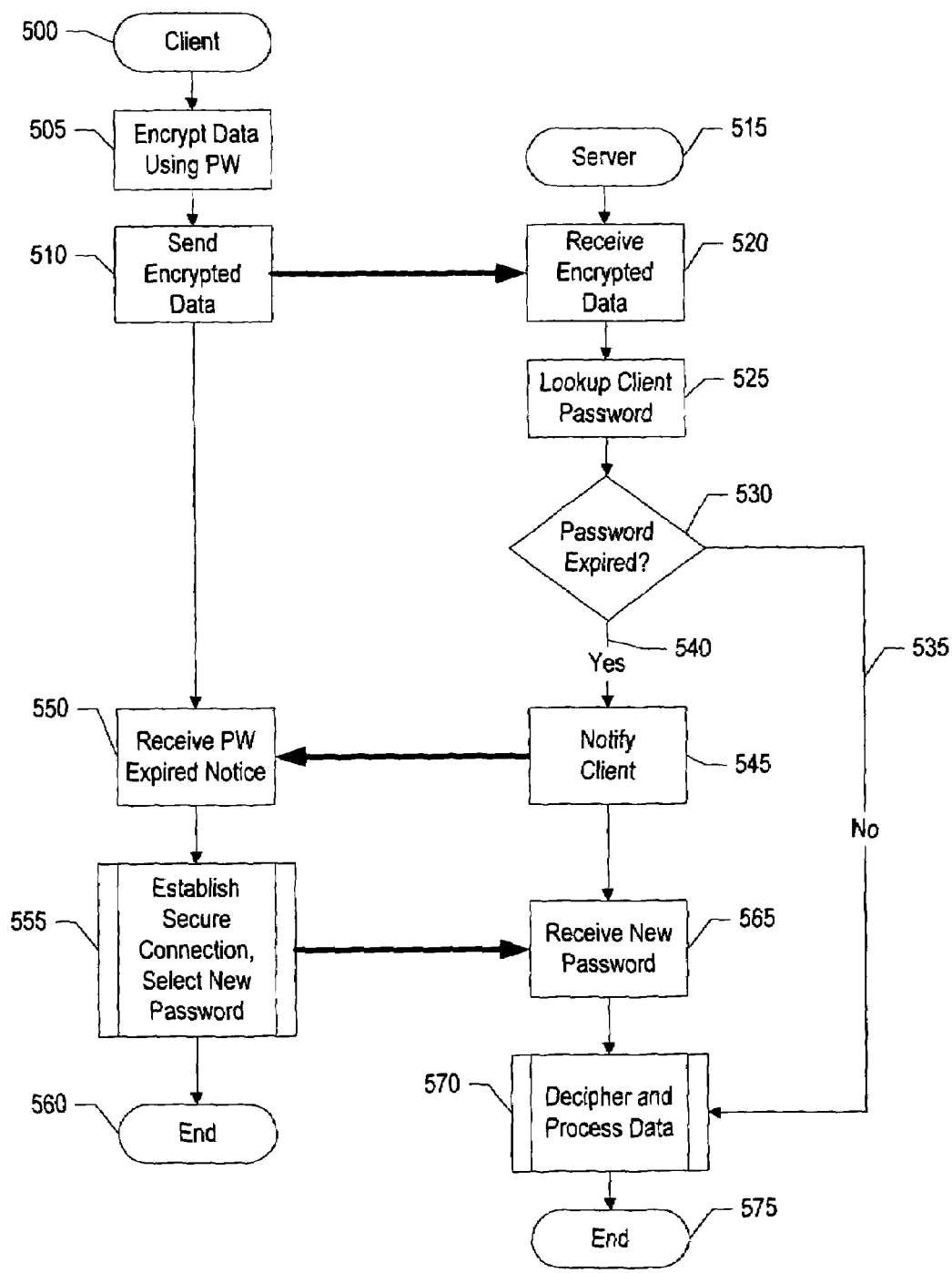
FIG. 5 is a flowchart showing the client renegotiating a password after the password expired.

FIG. 5 shows a flowchart used to renegotiate a stale password. Client computer begins processing at step 500 whereupon it encrypts data using the password previously shared between the client and server computers (step 505). Client computer then sends the encrypted data to the server computer (step 510). Server computer begins processing at step 515 thereafter receiving the encrypted data sent from client computer (step 520). Server computer uses the client computer's network address to look up the client's password. In this embodiment, a time/date stamp is included in the database storing the client passwords. The time/date stamp is compared with the current date to determine whether the password is still valid (step 530).

If the password is older than an allowed maximum time value (i.e., older than 24 hours), then the password is deemed to be stale and a new password is required by the system. If the password is not expired, "no" branch 535 is taken leading to the predefined process to decipher and process the encrypted data (step 570). On the other hand, if the password is expired, "yes" branch 540 is taken whereupon the server computer notifies the client computer that the password is expired and a new password is needed (step 545). The notification may take the form of an electronic message sent to the client computer. The client computer receives the password expired notice (step 550) whereupon it performs the steps necessary to establish a secure connection with the server computer and select a new password and re-encrypts the data using the new password (predefined process 555, see also FIG. 3). Once the password and re-encrypted data are sent, this portion of client processing is completed and terminated at step 560.

Once a new password has been selected and a secure connection has been established between the client and server computers, the new password is received by the server computer along with the re-encrypted data (step 565) where it is stored in the database replacing the expired password. The encrypted data is then deciphered and processed (step 570) before this section of server processing is terminated at step 575.

Figure 6:
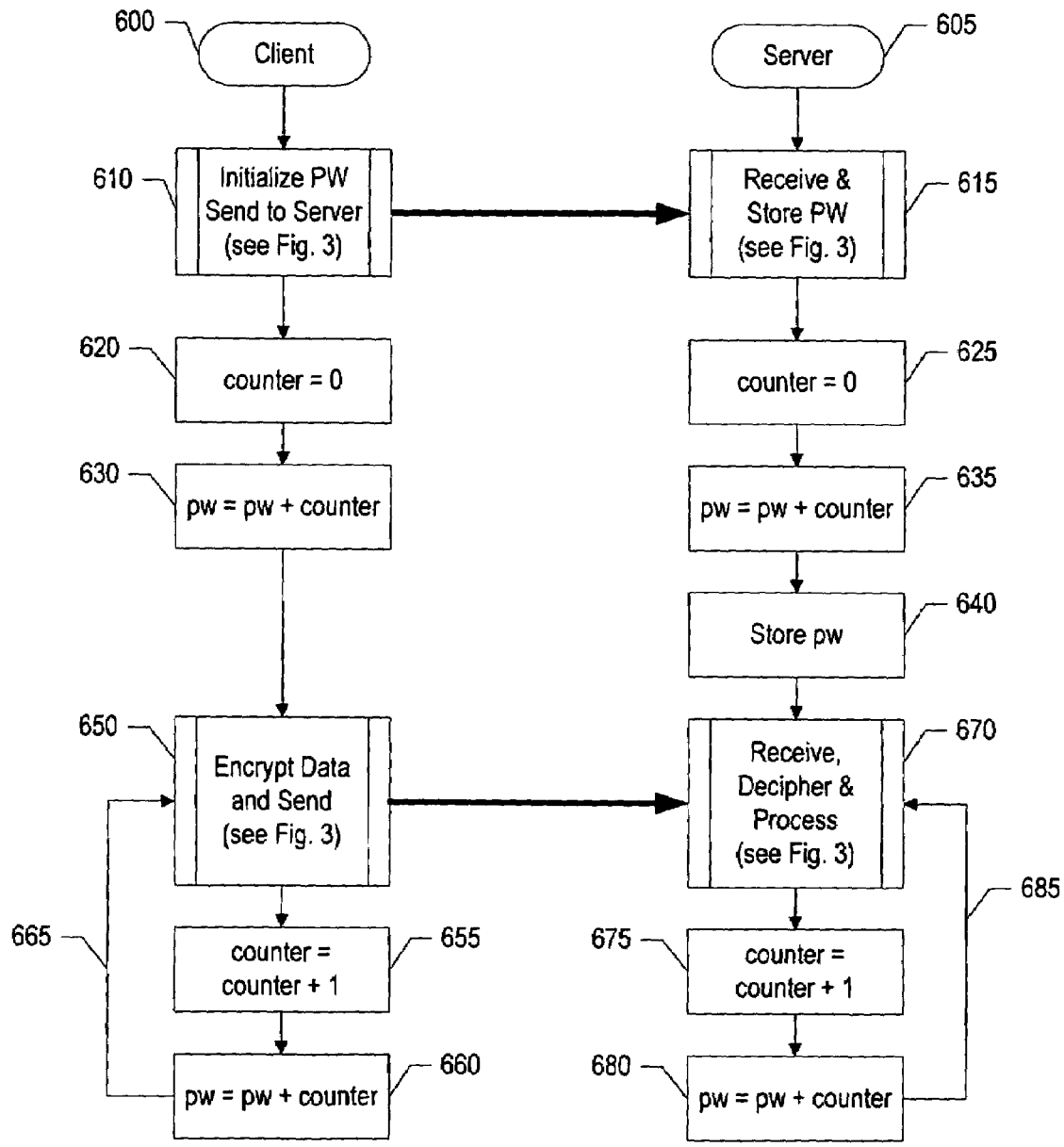
FIG. 6 is a flowchart showing the password being modified to enhance security.

FIG. 6 shows a flowchart used to repetitively modify the password used to encrypt data files in order to provide more security than a static password. Client processing commences at step 600 whereupon the client computer initializes a password by establishing a secure connection and sending the password to the server computer (step 610)(see FIG. 3 for further details). Server processing commences as step 605 whereupon it receives and stores the password selected by the client computer (step 615)(see FIG. 3 for further details). The client initializes a counter that is combined with the password (step 620). The client computer then modifies the password using the counter (step 630). Meanwhile, the server computer also initializes a counter (step 625), modifies the password the same way that the client computer modified the password (step 635) and stores the password and counter in a database (step 640). Client then encrypts data using the modified password and send the encrypted file to the server (step 650). The server receives the encrypted file, looks up the password (including the counter) deciphers the data file using the password and counter, and processes the data (step 670). Both the client and the server then increment the counter (steps 655 and 675, respectively) and modifies the password using the new counter value (steps 660 and 680 respectively). Both the client and server computer continue to send and receive encrypted data using continually modified passwords (loops 665 and 685, respectively). By continually modifying the password, an eavesdropper or snoop would not only have to know the original password, but would also have to know the number of data packets that have been sent between the client and server computers in order to successfully decipher the data.

Figure 7:
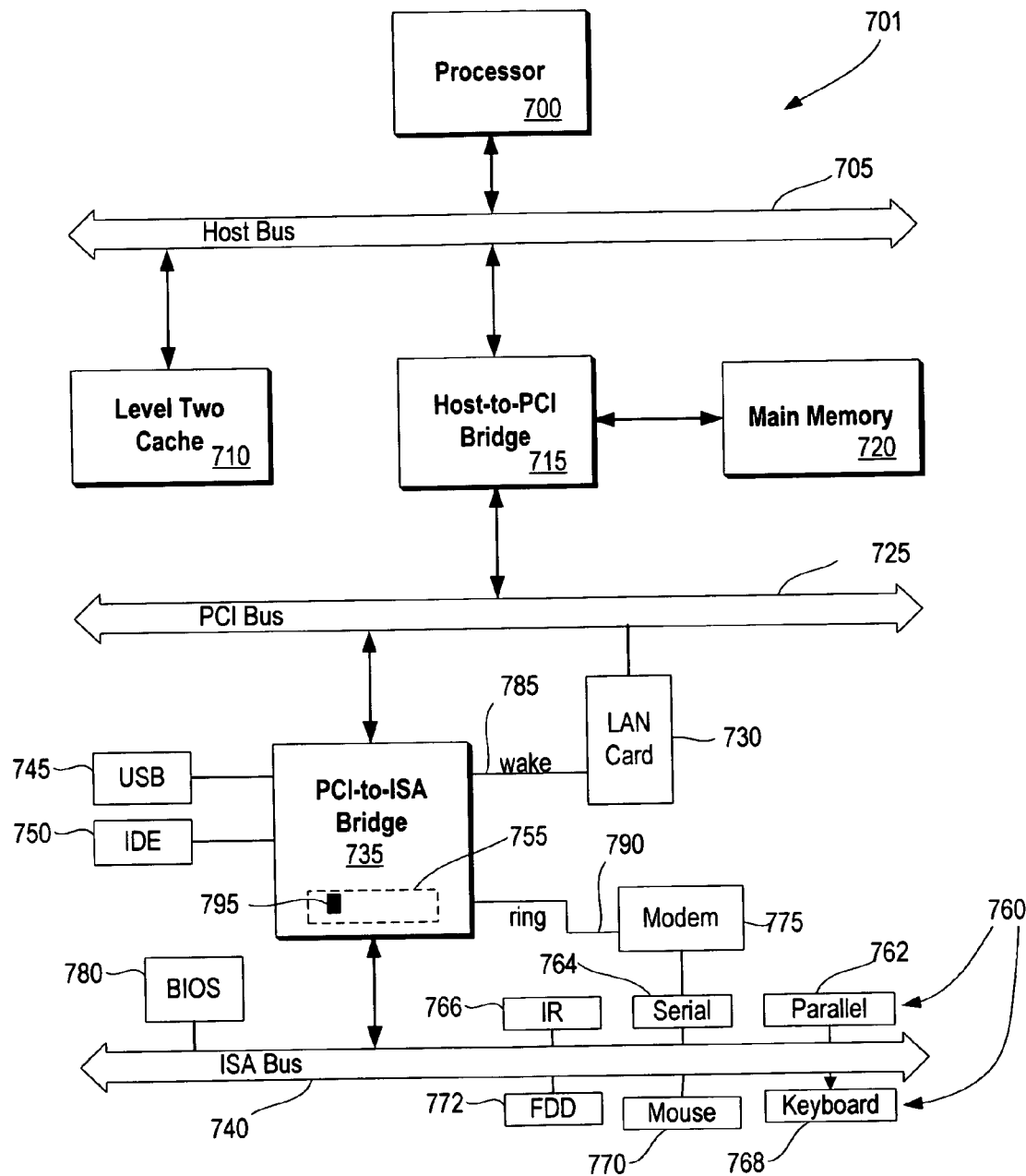
FIG. 7 is a block diagram of an information handling system capable of performing the present invention.

FIG. 7 illustrates information handling system 701 which is a simplified example of a computer system capable of performing the copy processing described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, and fixed disk (FDD) 772) coupled to ISA bus 740. Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 another computer system to copy files over a network, LAN card 730 is coupled to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for securely transmitting data in a network, said method comprising:
    sending a request from a first computer to a second computer prior to establishing a secure connection, the first computer and the second computer included in a plurality of computers;
    receiving a response from the second computer, whereby the response informs the first computer that the second computer accepts encrypted data;
    establishing the secure connection between the first computer and the second computer;
    transmitting a password across the secure connection, the password used to encrypt and decipher the data;
    encrypting the data using the password; and
    transmitting the encrypted data over a non-secure connection;
    changing the password by including a counter as part of the password; and wherein the counter is incremented after each transmission between the first and second computer systems.

2. The method as described in claim 1 further comprising:
    automatically sending a second password based on an event, the second password replacing the password as the encryption key.

3. The method as described in claim 2 wherein the event includes a time interval event.

4. The method as described in claim 2 wherein the event includes a preset number of transmissions occurring between two or more computers within the plurality of computers.

5. The method as described in claim 1 wherein the network includes the Internet.

6. The method as described in claim 1 wherein the data is selectively encrypted.

7. The method as described in claim 6 wherein the selection is based on determining a sensitivity corresponding to the data.

8. The method as described in claim 1 wherein the deciphering further comprises:
    analyzing the data packet and determining whether the data packet is encrypted; and
    selectively deciphering the data packet based on the analyzing.

9. A computer system comprising:
    a networked computer system including a plurality of computers connected by a computer network, each of the computers including:

one or more processors;

a memory connected to the processors; and a network connection that connects the computer with the computer network; and an encryption tool, the encryption tool including:

means for sending a request from the first computer system to the second computer system prior to establishing a secure connection, the first computer system and the second computer system included in a plurality of computer systems;

means for receiving a response from the second computer system, the response indicating that the second computer system accepts packets of data that is encrypted;

means for establishing the secure connection between the first computer system and a the second computer system, each of the computer systems connected to a computer network;

means for sending a password from the first computer system to the second computer system across the secure connection;

means for encrypting one or more packets of data using the password as an encryption key;

means for transmitting one or more of the encrypted packets of data from one of the computer systems to the other computer system;

means for deciphering the one or more encrypted packets of data at the receiving computer system using the password as the encryption key;

means for changing the password by including a counter as part of the password; and wherein the counter is incremented after each transmission between the first and second computer systems.

10. The computer system as described in claim 9 wherein the computer network is a private network.

11. The computer system as described in claim 9 wherein the encryption tool further includes:

means for sending a second password, the second password replacing the password as the encryption key.

12. The computer system as described in claim 9 wherein the means for sending is performed on a defined time interval.

13. The computer system as described in claim 9 wherein the means for sending is performed after a preset number of transmissions between the first and second computer systems.

14. The computer system as described in claim 9 wherein the computer network includes the Internet.

15. A computer program product in a computer usable medium for encrypting data between computers, said computer program product comprising:

means for sending a request from a first computer system to a second computer system prior to establishing a secure connection, the first computer system and the second computer system included in a plurality of computer systems;

means for receiving a response from the second computer system, whereby the response informs the first computer system that the second computer system accepts encrypted data;

means for establishing the secure connection between the first computer system and the second computer system, each of the computer systems connected to a computer network;

means for sending a password from the first computer system to the second computer system across the secure connection;

means for encrypting one or more packets of data using the password as an encryption key and means for deciphering the data packets using the password as the encryption key; and means for changing the password by including a counter as part of the password, wherein the counter is incremented after each transmission between the first and second computer systems.

16. The computer program product as described in claim 15 further comprising:

means for transmitting the one or more packets of data from one of the computer systems to the other computer system; and means for deciphering the one or more packets of data at the receiving computer system using the password as the encryption key.

17. The computer program product as described in claim 15 further comprising:

means for sending a second password, the second password replacing the password as the encryption key.

18. The computer program product as described in claim 15 wherein the computer network includes a private network.

19. The computer program product as described in claim 15 wherein the means for encrypting further comprises:

means for determining whether the data packets include sensitive information; and means for selectively performing the encrypting based on the determination.

20. The computer program product as described in claim 15 wherein the means for deciphering further comprises:

means for analyzing the data packet and determining whether the data packet is encrypted; and means for selectively deciphering the data packet based on the analysis.

21. A method for transmitting data securely between computers, said method comprising:

establishing a secure connection between a first computer system and a second computer system, each of the computer systems connected to a computer network;

sending a password from the first computer system to the second computer system across the secure connection;

encrypting one or more packets of data using the password as an encryption key and responsively deciphering the data packets using the password as the encryption key;

transmitting the one or more packets of data from one of the computer systems to the other computer system;

deciphering the one or more packets of data at the receiving computer system using the password as the encryption key;

sending a request from the first computer system to the second computer system prior to the establishing of the secure connection; and responding to the request by the second computer system, the response further including:

informing the first computer system that the second computer system accepts the data that is encrypted;

changing the password by including a counter as part of the password; and wherein the counter is incremented after each transmission between the first and second computer systems.

\* \* \* \* \*